United States Patent

McCain

[15] 3,690,556
[45] Sept. 12, 1972

[54] COMBINED FROTH-POUR SPRAY SYSTEM FOR RESIN FOAMS

[72] Inventor: Samuel B. McCain, Bothell, Wash.

[73] Assignee: Vertecs Corporation, Inc., Kirkland, Wash.

[22] Filed: Dec. 7, 1970

[21] Appl. No.: 95,439

[52] U.S. Cl. ............... 239/112, 239/117, 239/123, 239/412, 239/417.5, 239/427.5
[51] Int. Cl. ............................................. B05b 15/02
[58] Field of Search....... 239/112, 117, 123, 400, 407, 239/412, 417.5, 427.5, 428, 429, 433; 264/54; 260/2.5 BD, 2.5 BC

[56] References Cited

UNITED STATES PATENTS

| 3,263,928 | 8/1966 | Gusmer | 239/142 X |
|---|---|---|---|
| R24,514 | 8/1958 | Hoppe et al. | 260/2.5 BC |
| 3,451,786 | 6/1969 | Perrin | 260/2.5 BC |
| 3,057,273 | 10/1962 | Wilson | 239/112 X |
| 3,462,083 | 8/1969 | Kautz | 260/2.5 BC |
| 1,005,640 | 10/1911 | Gardner | 239/117 |
| 1,448,106 | 3/1923 | Binks | 239/400 |
| 2,539,314 | 1/1951 | Murphy | 239/400 |

OTHER PUBLICATIONS

" Frothing Rigid Urethane Foams," article in January, 1964, issue of Plastics Technology, pages 35– 37.

Primary Examiner—M. Henson Wood, Jr.
Assistant Examiner—Edwin D. Grant
Attorney—Hill, Sherman, Meroni, Gross & Simpson

[57] ABSTRACT

Apparatus for processing an organic resin froth from an airless-type spray gun employing an adapter which has a second mixing chamber coaxial with the spray axis of the gun, together with means for selectively introducing either a pressurized mixture of a physical blowing agent to create a froth from the material issuing from the spray gun or a solvent for cleaning the second mixing chamber at the conclusion of the spraying operation.

3 Claims, 2 Drawing Figures

PATENTED SEP 12 1972
3,690,556
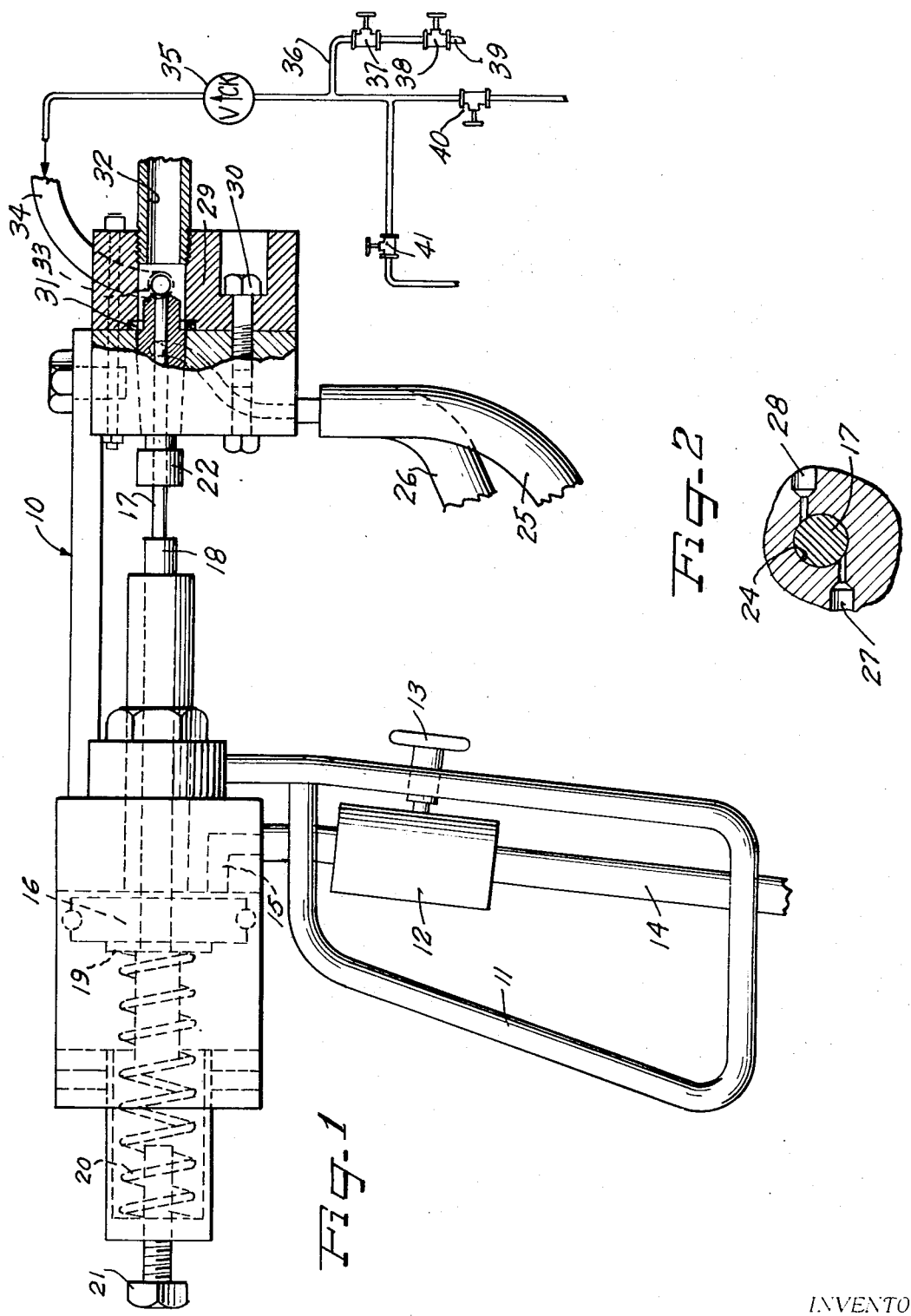
INVENTOR.
Samuel B. McCain
BY *[signature]* ATTORNEYS

COMBINED FROTH-POUR SPRAY SYSTEM FOR RESIN FOAMS

BACKGROUND OF THE INVENTION

1. Field of the Invention

This invention is in the field of foamed organic resins and is primarily concerned with adding the capability of frothing to a standard spray-type resin gun, which capability is accomplished by adding an adapter unit which receives the material discharge from the gun and converts it to a froth by the metered injection of a physical blowing agent into the chemicals as it issues from the gun.

2. Description of the Prior Art

The field of foam plastics or cellular plastics as it is sometimes called has advanced significantly since the early 1950's when it was first introduced. Foamed plastics have been made from material such as cellulose acetate, polystyrene, and polyethylene, but by far the most prevalent foam system currently used is the polyurethane system. A polyurethane foam system usually consists of two liquid components, polyols and isocyanates which react together rapidly to form a foam. Such compositions may also include additives such as emulsifiers, blowing agents, catalysts and modifiers.

There are three types of urethane foam, namely, rigid, semiflexible and flexible. The three types of foam have distinct advantages in a wide variety of applications. Because of its closed cellular nature, rigid foam is particularly valuable for construction, flotation applications and for insulation.

Since the urethane foaming process is generally quite rapid, the various production systems which have evolved require specialized equipment for metering and mixing the components. The ratio of components is fixed for any given system, so accurate metering is essential and the components must be thoroughly and almost instantaneously mixed.

One of the widely used techniques for depositing urethane foam is the so-called pour-in-place system. In this process, the foam system components are metered, mixed and dispensed as a liquid stream into a cavity where they react and expand to fill the void. The cavity may be an irregularly shaped mold, or a narrow panel, or the free space between two walls. Since considerable pressure may be generated during the foaming process, restraining jigs are usually used to maintain the desired dimensional shape until the foam has set. The period for setting may vary from about 5 to 30 or more minutes.

A second type of process for depositing urethane foam is the spraying process. Urethane foam systems may readily be sprayed using special spray guns which perform the dual function of mixing and atomization. Spray guns designed for this purpose may contain a mixer or the mixing may be accomplished by turbulence of the liquid components supplemented by the air used for atomization. In airless guns, opposed jets of components insure thorough mixing, and the high pressure fan issuing from the spray tip induces atomization.

A third system for applying polyurethane foam is the frothing system in which the partly reacted components are dispensed from the mixing head in a partially expanded state. This is accomplished either by preheating the components or by introducing a blowing agent which is a liquid under pressure but a gas under atmospheric conditions. The advantages of frothing are less leakage from small cracks in the cavity into which the froth is applied, rounder cells with somewhat greater strength in the transverse direction, slightly lower overall densities, and usually slightly lower pressure.

The particular installation involved will usually dictate the choice between the pour-in-place, the spraying and the frothing systems. However, a contractor should have equipment available for performing more than one of these processes if required. Since the equipment is quite expensive, however, not all contractors are prepared to provide this capability.

One of the most widely used and successful spraying systems for urethane foams is the Gusmer system marketed by the Gusmer Corporation of Old Bridge, New Jersey. The Gusmer gun, as shown in and described in U.S. Pat. Nos. 2,890,836 and 3,263,928, is a positive displacement, airless type gun in which a reciprocating piston slides within the mixing chamber and the gun nozzle. When the piston is retracted, inlet ports are exposed to the mixing chamber, and the reactants (polyol and isocyanates) are than injected into the mixing chamber in a turbulent motion, under pressure, and issue from the nozzle as a finely divided spray. The air pressure actuated piston is then moved into the mixing chamber, closing off the inlets at the conclusion of the spraying operation, providing the device with a self-cleaning feature which is a definite advantage over other types of spray guns heretofore used.

SUMMARY OF THE INVENTION

The present invention is directed to an adapter which can be used in conjunction with the aforementioned Gusmer type gun or other airless, positive displacement type of spray gun to process froth chemical formulations, thereby increasing the functional capability of the gun at a relatively modest cost. The adapter includes a body portion which is arranged to be fixedly secured against the head of the spray gun, and has an open ended mixing chamber which is coaxial with the material axis emanating from the spray gun. A peripheral inlet is formed about the mixing chamber and serves to introduce a physical blowing agent underpressure into the mixing chamber. The resulting expansion of the liquefied blowing agent serves to form a froth which issues from the end of the mixing chamber and may be applied to the job site. When the spraying operation is completed, the inlet is selectively connected to a source of solvent which introduces a stream of the solvent into the mixing chamber to wash the same clean of any adherent materials.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a partly schematic view, partly in elevation and partly in cross-section illustrating a froth-pour system of the present invention; and FIG. 2 is a fragmentary cross-sectional view of the mixing chamber within the spray gun itself.

DESCRIPTION OF THE PREFERRED EMBODIMENTS

In FIG. 1, reference numeral 10 indicates generally a spray gun embodying the type of construction which has been marketed heretofore by the Gusmer Corporation. This structure is merely illustrative of the invention since any airless type spray gun used for spraying foamable resin compositions can also be used. The gun 10 includes a handle 11 with which there is associated an air valve 12 having an operating button 13. The valve 12 is located in a compressed air line 14 which provides air under pressure from any suitable source (not shown). Upon pressing the operating button 13, compressed air is admitted into the interior of the gun through an inlet port 15 where it acts against the face of a piston 16 reciprocable within the gun body. To the piston is attached a plunger 17, the latter extending through a sleeve 18 connected to the body of the gun. An adjustment nut 19 is located behind the piston 16 to adjust the amount the free end of the plunger 17 extends through the spray head, as will be apparent from a succeeding portion of this description. A coiled spring 20 acts against the adjustment nut 19 and has one end bottomed against the rear end of the gun housing. Extending axially into the gun housing is an adjustment bolt 21 which serves as a stop to limit the extent of rearward travel of the piston and plunger assembly.

The free end of the plunger 17 passes through a gland nut 22 and is received within a spray head generally indicated at reference numeral 23 in the drawings. The end of the plunger 17 is slidably received along the wall 24 of a mixing chamber formed in the spray head 23. The two reactants for the polyurethane resin forming reaction, the polyol and the isocyanate, are separately delivered under pressure by means of conduits 25 and 26 to inlet ports 27 and 28 as shown in FIG. 2 of the drawings. These ports are formed to inject the reactants generally tangentially to the mixing chamber 24, so that in entering the mixing chamber, a substantial amount of turbulence is created which serves to provide efficient mixing of the ingredients and rapid initiation of the resin forming reaction.

Material processing is initiated by operating the button 13 so that compressed air forces the piston 16 rearwardly against the bias provided by the spring 20. In doing so, the movement of the piston 16 causes the plunger 17 to be moved backwardly in the mixing chamber 24 thereby uncovering the inlet ports 27 and 28 so that the reactants are thoroughly mixed and then issue through the spray orifice at the front of the gun. To terminate the material process operation, pressure on the button 13 is released whereupon the plunger 17 is forced forwardly to close off the inlet ports 27 and 28 as shown in FIG. 2. The rubbing or sliding action of the plunger 17 against the wall of the mixing chamber 24 serves to remove any accumulated material and provides this type of gun with a self-cleaning feature.

The adapter provided in the present invention to convert the spray operation to a frothing operation includes a body portion 29 which is secured to the spray head 23 by means of bolts 30 or the like. Interposed between the body portion 29 and the spray gun itself is a sealing ring such as an O-ring 31.

Formed in the body portion 29 is a mixing chamber 32, the chamber 32 being coaxial with the spray orifice from the spray gun 10 so that it receives the discharge issuing from the spray head. At the periphery of the mixing chamber 32 is an inlet 33 which is arranged to introduce either a physical blowing agent under pressure, or a cleansing solvent. As illustrated schematically in FIG. 1, the mixing chamber 32 is connected by means of a conduit 34 to a check valve 35. Feeding the check valve 35 is a line 36 which is connected to a shut-off valve 37 located in series with a preset metering valve 38. The latter is connected by means of a line 39 to a supply of normally liquid blowing agent.

There are many physical blowing agents used to create froth in resinous compositions. Typical among these are the aliphatic hydrocarbons such as pentane, neopentane, hexane, isohexane, heptane, and isoheptane. Aromatic hydrocarbons such as benzene and toluene have also been employed for this purpose. Halogenated hydrocarbons such as methylene chloride, trichloroethylene and symmetrical dichloroethane have also been used. Of particular importance are the aliphatic fluorocarbons such as dichlorotetrafluoroethane, trichlorofluoromethane and trichlorotrifluoroethane and mixtures of these fluorocarbons.

The normally liquid blowing agent is injected into the mixing chamber 32 by the action of a compressed air source (not shown) which is controlled by a shut-off valve 40.

Also feeding the check valve 35 is a supply of solvent for the reactants which appear in the mixing chamber 32. The supply of solvent (not shown) is under the control of a shut-off valve 41.

In operation, to produce a froth, the operating button 13 is depressed, while opening the air supply shut-off valve 40 and the blowing agent shut-off valve 37. The combination of the ingredients, the urethane froth chemicals as delivered by the spray gun, the compressed air, and the blowing agent produces a froth urethane foam in the mixing chamber 32 which can be directed into the particular void to be filled.

The ratio of blowing agent can be adjusted by the preset metering valve 38. After delivery of the desired quantity of urethane chemicals and blowing agent, the equipment is shut off by releasing the button 13 and the supply of blowing agent is terminated by closing the valve 37. This is followed immediately by opening the solvent supply shut-off valve 41 to cause purging of the inlet to the mixing chamber 30 with a thorough rinse of flushing solvent and compressed air. Following the solvent rinse, the assembly is ready for another cycle of operation.

The adapter of the present invention utilizes the inherent advantages of existing equipment which is limited to spray application, and thereby makes it possible to manufacture froth systems without an additional substantial investment in mixing equipment. The savings in equipment outlay, combined with the convenience of rapid and inexpensive changeover to modify the standard spray gun to manufacture froth urethane renders the adapter of the present invention an important modification to standard spray equipment.

I claim as my invention:

1. In a spray device of the type including a spray head, including a first axially extending mixing chamber, means for delivering a polyol and an isocyanate into said mixing chamber for admixture therein, and a spray orifice for spraying the resulting reaction product therefrom, the improvement which comprises a body member secured to said spray head and having an elongated mixing chamber coaxial with and communicating with said spray orifice, and inlet means normal to the axis of said elongated mixing chamber for injecting a blowing agent radially with respect to the reaction product issuing from said spray orifice.

2. The spray device of claim 1 in which said inlet means is positioned between said spray orifice and the inlet to said elongated mixing chamber.

3. The spray device of claim 1 which includes a supply of solvent selectively connectible to said inlet means to direct a stream of solvent into said mixing chamber.

* * * * *